US012614822B2

(12) United States Patent
Fang et al.

(10) Patent No.: US 12,614,822 B2
(45) Date of Patent: Apr. 28, 2026

(54) BATTERY CELL, METHOD AND SYSTEM FOR MANUFACTURING SAME, BATTERY, AND ELECTRICAL DEVICE

(71) Applicant: CONTEMPORARY AMPEREX TECHNOLOGY (HONG KONG) LIMITED, Hong Kong (CN)

(72) Inventors: Kun Fang, Ningde (CN); Zhijun Guo, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 612 days.

(21) Appl. No.: 18/112,501

(22) Filed: Feb. 22, 2023

(65) Prior Publication Data

US 2023/0207992 A1    Jun. 29, 2023

Related U.S. Application Data

(63) Continuation of application No. PCT/CN2021/122104, filed on Sep. 30, 2021.

(51) Int. Cl.
*H01M 50/578*        (2021.01)
*H01M 10/0587*        (2010.01)
(Continued)

(52) U.S. Cl.
CPC ..... *H01M 50/578* (2021.01); *H01M 10/0587* (2013.01); *H01M 50/107* (2021.01);
(Continued)

(58) Field of Classification Search
None
See application file for complete search history.

(56) References Cited

U.S. PATENT DOCUMENTS

2004/0023108 A1* 2/2004 Nakanishi ........... H01M 50/562
429/178
2011/0111270 A1* 5/2011 Osswald ............... H01M 50/24
429/163
(Continued)

FOREIGN PATENT DOCUMENTS

CN        101373823 A    2/2009
CN        201994356 U    9/2011
(Continued)

OTHER PUBLICATIONS

Office Action issued Apr. 30, 2024 in Japanese Patent Application No. 2023-509718 with English translation thereof.
(Continued)

*Primary Examiner* — Alix E Eggerding
(74) *Attorney, Agent, or Firm* — XSENSUS LLP

(57)        ABSTRACT

A battery cell may include: a housing having an opening; an electrode assembly, accommodated in the housing, where a first tab may be disposed on the electrode assembly at an end oriented toward the opening; and an end cap, configured to fit and cover the opening, where the end cap may include a first connector and a rupturable structure. The rupturable structure may be disposed along an edge of the first connector. The end cap may rupture along the rupturable structure when an internal pressure of the battery cell reaches a threshold, so as to release the internal pressure. The battery cell may further include a fixing structure, and the fixing structure may fixedly connect the first connector to the first tab, so as to restrict movement of the first connector.

28 Claims, 6 Drawing Sheets

(51) Int. Cl.

| | |
|---|---|
| *H01M 50/107* | (2021.01) |
| *H01M 50/159* | (2021.01) |
| *H01M 50/169* | (2021.01) |
| *H01M 50/342* | (2021.01) |
| *H01M 50/536* | (2021.01) |
| *H01M 50/538* | (2021.01) |

(52) U.S. Cl.
CPC ....... *H01M 50/159* (2021.01); *H01M 50/169* (2021.01); *H01M 50/3425* (2021.01); *H01M 50/536* (2021.01); *H01M 50/538* (2021.01)

(56) References Cited

U.S. PATENT DOCUMENTS

| | | | |
|---|---|---|---|
| 2020/0243822 A1 | 7/2020 | Sodeyama et al. | |
| 2021/0184308 A1* | 6/2021 | Kim .................. | H01M 10/0525 |

FOREIGN PATENT DOCUMENTS

| | | | |
|---|---|---|---|
| CN | 204361193 | U | 5/2015 |
| CN | 112713345 | A | 4/2021 |
| CN | 112768845 | A | 5/2021 |
| CN | 113258124 | A | 8/2021 |
| CN | 216085200 | U | 3/2022 |
| JP | H06-196139 | A | 7/1994 |
| JP | 9-129208 | A | 5/1997 |
| JP | H10-214609 | A | 8/1998 |
| JP | H11-86819 | A | 3/1999 |
| JP | H11-260334 | A | 9/1999 |
| JP | H11-329402 | A | 11/1999 |
| JP | 2013-543229 | A | 11/2013 |
| JP | 2019-009057 | A | 1/2019 |
| JP | 2020-513642 | A | 5/2020 |
| KR | 10-2008-0082266 | A | 9/2008 |
| WO | 2017/043023 | A1 | 3/2017 |
| WO | 2019/148662 | A1 | 8/2019 |
| WO | 2021/145247 | A1 | 7/2021 |

OTHER PUBLICATIONS

Notice of the Granting of a Patent Right for an Invention issued Jul. 1, 2025 in Chinese Patent Application No. 202180081089.7 with English translation thereof.

International Search Report mailed on May 26, 2022, received for PCT Application PCT/CN2021/122104, filed on Sep. 30, 2021, 6 pages including English Translation.

Partial Supplementary European Search Report issued Mar. 18, 2025 in European Patent Application No. 21958858.9.

Notice of Reasons for Refusal issued Nov. 5, 2024 in Japanese Patent Application No. 2023-509718 with machine English translation thereof.

* cited by examiner

1

2

6

7

30

7

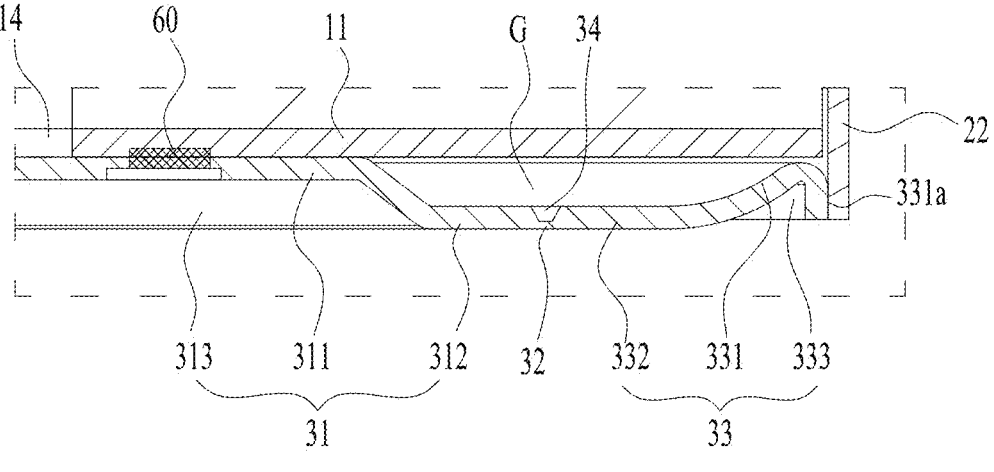

FIG. 9

| S100 |
|---|
| Provide a housing, where an opening is made on the housing |

↓ S200

| |
|---|
| Provide an electrode assembly, and mount the electrode assembly into the housing, where a first tab is disposed on the electrode assembly at an end oriented toward the opening |

↓ S300

| |
|---|
| Provide an end cap, and connect the end cap to the housing so that the end cap fits and covers the opening, where the end cap includes a first connecting portion and a fragile portion, and the fragile portion is disposed along an edge of the first connecting portion |

↓ S400

| |
|---|
| Connect the first connecting portion to the first tab fixedly to form a fixing structure, so as to restrict movement of the first connecting portion |

FIG. 10

BATTERY CELL, METHOD AND SYSTEM FOR MANUFACTURING SAME, BATTERY, AND ELECTRICAL DEVICE

CROSS-REFERENCE TO RELATED APPLICATION

The present application is a continuation of International Application No. PCT/CN2021/122104, filed Sep. 30, 2021, which is incorporated herein by reference in its entirety.

TECHNICAL FIELD

This application relates to the technical field of batteries, and more specifically, to a battery cell, a method and system for manufacturing same, a battery, and an electrical device.

BACKGROUND

Battery cells are widely used in electronic devices such as a mobile phone, a notebook computer, an electric power cart, an electric vehicle, an electric airplane, an electric ship, an electric toy car, an electric toy ship, an electric toy airplane, and a power tool. The battery cells may include a nickel-cadmium battery cell, a nickel-hydrogen battery cell, a lithium-ion battery cell, a secondary alkaline zinc-manganese battery cell, and the like.

In the development of battery technology, safety is a non-negligible problem in addition to improvement of the performance of the battery cell. If the safety of the battery cell is not guaranteed, the battery cell is not suitable for use. Therefore, how to enhance the safety of the battery cell is an urgent technical problem in the battery technology.

SUMMARY

This application provides a battery cell, a method and system for manufacturing same, a battery, and an electrical device to enhance safety of the battery cell.

According to a first aspect, an embodiment of this application provides a battery cell, including:

a housing, on which an opening is made;

an electrode assembly, accommodated in the housing, where a first tab is disposed on the electrode assembly at an end oriented toward the opening; and an end cap, configured to fit and cover the opening, where the end cap includes a first connecting portion or connector and a fragile portion or rupturable structure, the fragile portion is disposed along an edge of the first connecting portion, and the end cap is configured to rupture along the fragile portion when an internal pressure of the battery cell reaches a threshold, so as to release the internal pressure.

The battery cell further includes a fixing structure, and the fixing structure is configured to fixedly connect the first connecting portion to the first tab, so as to restrict movement of the first connecting portion.

In the foregoing technical solution, the first connecting portion of the end cap is fixedly connected to the first tab of the electrode assembly by the fixing structure. In this way, the first tab of the electrode assembly can restrict the movement of the first connecting portion during the operation of the battery cell, thereby reducing the deformation and flipping of the end cap, reducing an alternating stress borne by the fragile portion, slowing down fatigue and aging of the fragile portion of the end cap, reducing the risk of premature rupture and pressure relief of the end cap during normal operation of the battery cell, and helping to improve safety and stability of the battery cell.

In some embodiments, the first connecting portion is electrically connected to the first tab by the fixing structure.

In the foregoing technical solution, the end cap may be electrified, and may serve as an output electrode of the battery cell, thereby saving a conventional electrode terminal and simplifying the structure of the battery cell.

In some embodiments, the fixing structure is configured to be at least partly broken when the internal pressure of the battery cell reaches the threshold, so as to disconnect the first connecting portion from the first tab.

In the foregoing technical solution, after the first connecting portion is disconnected from the first tab, the first tab no longer limits the movement of the first connecting portion. With the rupture of the fragile portion, the first connecting portion can be burst open by gas pressure to enlarge a channel configured to release the internal pressure, thereby quickly releasing the internal pressure and improving the safety.

In some embodiments, the fixing structure is a weld portion or structure formed by welding the first tab to the first connecting portion.

In the foregoing technical solution, the first connecting portion is directly connected to the first tab by welding, thereby simplifying the structure of the battery cell.

In some embodiments, the battery cell further includes a current collecting member or structure disposed between the end cap and the first tab. The current collecting member is configured to connect the first connecting portion to the first tab to implement electrical connection between the end cap and the first tab. The fixing structure includes a first fixing structure and a second fixing structure. The first fixing structure is a weld portion or structure formed by welding one part of the current collecting member to the first tab. The second fixing structure is a weld portion or structure formed by welding the other part of the current collecting member to the first connecting portion.

In the foregoing technical solution, a current collecting member is disposed in the battery cell, and the current collecting member is welded to the first connecting portion and the first tab separately to implement electrical connection between the end cap and the first tab. The current collecting member may fit the first connecting portion closely to reduce the risk of generating microcracks on the first connecting portion, improve sealing performance, and reduce safety hazards.

In some embodiments, the current collecting member includes a first current collecting portion or structure and a second current collecting portion or structure. The first current collecting portion surrounds the second current collecting portion. The first fixing structure is a weld portion formed by welding the first current collecting portion to the first tab. The second fixing structure is a weld portion formed by welding the second current collecting portion to the first connecting portion.

In the foregoing technical solution, the first fixing structure and the second fixing structure are formed on the first current collecting portion and the second current collecting portion respectively. In this way, the first fixing structure is prevented from affecting the welding between the first connecting portion and the current collecting member, and the connection strength between the first connecting portion and the current collecting member is increased.

In some embodiments, the second fixing structure is configured to be broken when the internal pressure of the battery cell reaches the threshold, so as to disconnect the second current collecting portion from the first connecting portion.

In the foregoing technical solution, after the first connecting portion is disconnected from the second current collecting portion, the first tab no longer limits the movement of the first connecting portion through the current collecting member. With the rupture of the fragile portion, the first connecting portion can be burst open by gas pressure to enlarge a channel configured to release the internal pressure, thereby quickly releasing the internal pressure and improving the safety.

In some embodiments, connection strength between the second current collecting portion and the first connecting portion is less than connection strength between the first current collecting portion and the first tab.

In the foregoing technical solution, when the battery cell is thermally runaway, the end cap exerts a pulling force on the current collecting member and the first tab under the action of gas pressure. The connection strength between the second current collecting portion and the first connecting portion is less than the connection strength between the first current collecting portion and the first tab, and therefore, the current collecting member is detached from the first connecting portion first. After the current collecting member is detached from the first connecting portion, the current collecting member no longer receives the pulling force of the end cap, thereby keeping the fixed connection between the current collecting member and the first tab, and reducing the risk that the current collecting member blocks the channel configured to release the internal pressure.

In some embodiments, the first connecting portion includes a first protruding portion or structure and a first plate body around the first protruding portion. The first protruding portion protrudes from an inner surface of the first plate body toward the electrode assembly. A first recessed portion or recess is formed on the first connecting portion at a position corresponding to the first protruding portion, where the first recessed portion is recessed from an outer surface of the first plate body toward the electrode assembly. The fragile portion is located on an outer side of the first plate body and arranged along an outer edge of the first plate body. The second current collecting portion abuts on and is welded to the first protruding portion to form the second fixing structure.

In the foregoing technical solution, the first recessed portion can reduce the strength of the first protruding portion and increase elasticity of the first protruding portion. In this way, when the battery cell vibrates, the first protruding portion can deform to release the stress, reduce the stress transmitted to the fragile portion, and slow down the fatigue and aging of the fragile portion. The first recessed portion can further reduce the thickness of the first protruding portion, reduce the energy required for welding the first protruding portion to the second current collecting portion, reduce the heat transferred to the fragile portion, and slow down the fatigue and aging of the fragile portion.

In some embodiments, the first current collecting portion overlays the fragile portion in a thickness direction of the end cap.

In the foregoing technical solution, the current collecting member can separate the fragile portion from the first tab, so as to reduce active particles dropping onto the fragile portion from the electrode assembly and reduce the risk of corroding the fragile portion.

In some embodiments, the first protruding portion supports the current collecting member so that an avoidance clearance configured to avoid the fragile portion is formed between the first current collecting portion and the end cap.

In the foregoing technical solution, the first connecting portion supports the first tab through the current collecting member, thereby reducing the shaking amplitude of the electrode assembly during vibration of the battery cell, and improving stability of the electrode assembly. The avoidance clearance can separate the fragile portion from the first current collecting portion, so that it is avoided that the channel configured to release the internal pressure is blocked by the first current collecting portion when the fragile portion is ruptured, thereby improving safety.

In some embodiments, the electrode assembly is a jelly-roll structure, and a first through-hole is made at a winding center of the electrode assembly. A second through-hole is made in the second current collecting portion. The second through-hole is disposed opposite to the first through-hole and configured to guide gas in the electrode assembly to the first connecting portion.

In the foregoing technical solution, when the electrode assembly is thermally runaway, the high-temperature and high-pressure gas can act on the first connecting portion through the first through-hole and the second through-hole, thereby quickly disconnecting the first connecting portion from the current collecting member.

In some embodiments, the end cap further includes a second connecting portion or connector. The second connecting portion surrounds the first connecting portion and is configured to be fixedly connected to the housing. The fragile portion is located between the first connecting portion and the second connecting portion and configured to connect the first connecting portion and the second connecting portion.

In the foregoing technical solution, the end cap is fixed to the housing by the second connecting portion around the fragile portion, so as to increase the spacing between the fragile portion and the housing, reduce the stress transmitted to the fragile portion, and slow down the fatigue and aging of the fragile portion.

In some embodiments, the fragile portion is configured to rupture to disconnect the first connecting portion from the second connecting portion when the internal pressure of the battery cell reaches the threshold.

In the foregoing technical solution, after the first connecting portion is disconnected from the second connecting portion, the first connecting portion and the second connecting portion can be flipped outward by the internal pressure, so as to enlarge the channel configured to release the internal pressure, quickly release the internal pressure, and improve safety.

In some embodiments, the second connecting portion includes a second plate body and a second protruding portion or structure around the second plate body. The second protruding portion protrudes from an inner surface of the second plate body toward the electrode assembly. A second recessed portion or recess is formed on the second connecting portion at a position corresponding to the second protruding portion, where the second recessed portion is recessed from an outer surface of the second plate body toward the electrode assembly. The second plate body surrounds the fragile portion, and the second protruding portion is configured to be fixedly connected to the housing.

In the foregoing technical solution, the second recessed portion can reduce the strength of the second protruding portion and increase elasticity of the second protruding portion. In this way, when the battery cell vibrates, the stress on the housing is transmitted to the second protruding portion. The second protruding portion can deform to release the stress, reduce the stress transmitted to the fragile portion, and slow down the fatigue and aging of the fragile portion.

In some embodiments, an outer side face of the second protruding portion abuts on an inner surface of the housing and is configured to be welded to the housing to close the opening.

In the foregoing technical solution, the sealing is implemented by welding, so as to reduce the risk of leaking an electrolytic solution, and increase the connection strength and flow capacity between the second protruding portion and the housing. The second recessed portion can reduce the strength of the second protruding portion and increase elasticity of the second protruding portion. In this way, during welding between the second protruding portion and the housing, the second protruding portion can deform to release the welding stress, thereby reducing the risk of deformation and cracking of a weld region, reducing the welding stress transmitted to the fragile portion, and improving safety.

In some embodiments, the second protruding portion abuts on the first tab to support the first tab.

In the foregoing technical solution, the second protruding portion supports the first tab, thereby reducing the shaking amplitude of the electrode assembly during vibration of the battery cell, and improving stability of the electrode assembly.

In some embodiments, the fragile portion surrounds the first connecting portion by one circle.

In the foregoing technical solution, the fragile portion surrounds the first connecting portion by one circle, thereby increasing the range of the fragile portion, increasing the degassing speed when the fragile portion is ruptured, and improving the safety.

In some embodiments, a groove is made on the end cap, and the fragile portion is formed in a region corresponding to the groove on the end cap.

In the foregoing solution, the thickness and strength of the fragile portion are reduced by the groove, so that the end cap can be ruptured along the fragile portion when the internal pressure of the battery cell reaches the threshold.

In some embodiments, the end cap includes a first nickel layer, a steel layer, and a second nickel layer. The first nickel layer is disposed on a surface that is of the steel layer and that is oriented toward the first tab. The second nickel layer is disposed on a surface that is of the steel layer and that is oriented away from the first tab. The groove is recessed toward the second nickel layer from a surface that is of the first nickel layer and that is oriented away from the steel layer. A depth of the groove is greater than a thickness of the first nickel layer and less than a sum of the thickness of the first nickel layer and a thickness of the steel layer.

In the foregoing technical solution, the groove is located on the inner side of the end cap, thereby avoiding damage to the external second nickel layer during formation. Therefore, the second nickel layer can protect the steel layer from outside, so as to reduce the risk of corroding the steel layer. The steel layer itself is not prone to be corroded by the electrolytic solution. Therefore, even if exposing the steel layer, the groove is not prone to give rise to safety hazards.

In some embodiments, the end cap is configured to electrically connect the first tab to the housing.

In the foregoing technical solution, the housing itself may serve as an output electrode of the battery cell. When a plurality of battery cells are assembled in groups, the housing may be electrically connected to a busbar component, thereby not only increasing the flow area, but also making the structural design of the busbar component more flexible.

In some embodiments, the housing further includes a sidewall and a bottom wall connected to the sidewall. The sidewall extends along the thickness direction of the end cap and is disposed around the electrode assembly. An electrode lead-out hole is disposed on the bottom wall. The electrode assembly further includes a second tab of a polarity opposite to the first tab. The second tab is disposed on the electrode assembly at an end oriented away from the opening. The battery cell further includes an electrode terminal mounted in the electrode lead-out hole, and the electrode terminal is electrically connected to the second tab.

In the foregoing technical solution, the bottom wall and the electrode terminal may serve as two output electrodes of the battery cell respectively, thereby simplifying the structure of the battery cell and ensuring a high flow capacity of the battery cell. The bottom wall and the electrode terminal are located at the same end of the battery cell. In this way, when a plurality of battery cells are assembled in groups, the busbar component may be fitted onto the same side of the battery cell, thereby simplifying the assembling process and improving the assembling efficiency.

In some embodiments, the bottom wall and the sidewall are a one-piece structure.

The foregoing technical solution avoids the step of connecting the bottom wall and the sidewall.

In some embodiments, the first tab is a negative tab, and a substrate material of the housing is steel.

In the foregoing technical solution, the housing is electrically connected to the negative tab. That is, the housing is in a low-potential state. The steel housing in the low-potential state is not prone to be corroded by an electrolytic solution, thereby reducing safety hazards.

In some embodiments, the battery cell is a cylindrical cell.

According to a second aspect, an embodiment of this application provides a battery, including a plurality of battery cells according to any embodiment in the first aspect.

According to a third aspect, an embodiment of this application provides an electrical device, including the battery according to the second aspect. The battery is configured to provide electrical energy.

According to a fourth aspect, an embodiment of this application provides a method for manufacturing a battery cell, including:

providing a housing, where an opening is made on the housing;

providing an electrode assembly, and mounting the electrode assembly into the housing, where a first tab is disposed on the electrode assembly at an end oriented toward the opening;

providing an end cap, and connecting the end cap to the housing so that the end cap fits and covers the opening, where the end cap includes a first connecting portion and a fragile portion, and the fragile portion is disposed along an edge of the first connecting portion; and connecting the first connecting portion to the first tab fixedly to form a fixing structure, so as to restrict movement of the first connecting portion.

The end cap is configured to rupture along the fragile portion when an internal pressure of the battery cell reaches a threshold, so as to release the internal pressure.

According to a fifth aspect, an embodiment of this application provides a system for manufacturing a battery cell, including:

a first providing apparatus, configured to provide a housing, where an opening is made on the housing;

a second providing apparatus, configured to provide an electrode assembly, and mount the electrode assembly into the housing, where a first tab is disposed on the electrode assembly at an end oriented toward the opening;

a third providing apparatus, configured to provide an end cap, and connect the end cap to the housing so that the end cap fits and covers the opening, where the end cap includes a first connecting portion and a fragile portion, and the fragile portion is disposed along an edge of the first connecting portion; and an assembling apparatus, configured to connect the first connecting portion to the first tab fixedly to form a fixing structure, so as to restrict movement of the first connecting portion.

The end cap is configured to rupture along the fragile portion when an internal pressure of the battery cell reaches a threshold, so as to release the internal pressure.

BRIEF DESCRIPTION OF DRAWINGS

To describe the technical solutions of the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

FIG. 9 is a schematic close-up view of a rectangular position B of the battery cell shown in FIG. 8;

FIG. 10 is a schematic flowchart of a method for manufacturing a battery cell according to some embodiments of this application.

Figure 1:
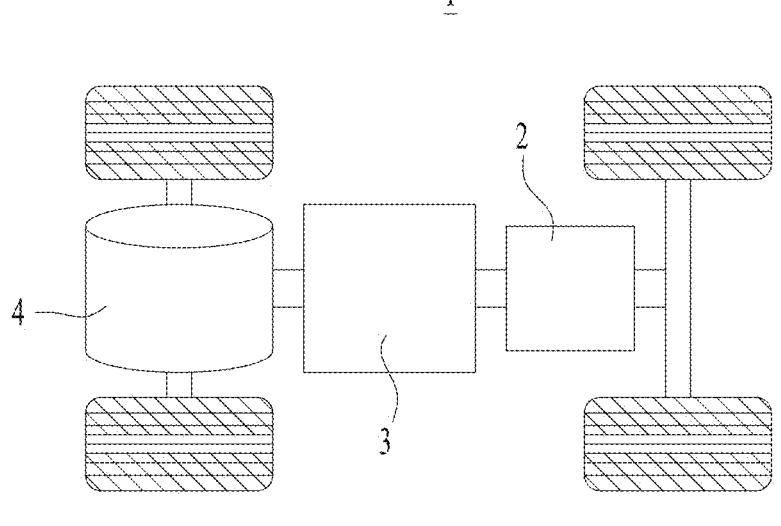
FIG. 1 is a schematic structural diagram of a vehicle according to some embodiments of this application.

The drawings are not drawn to scale.

DETAILED DESCRIPTION OF EMBODIMENTS

To make the objectives, technical solutions, and advantages of the embodiments of this application clearer, the following gives a clear description of the technical solutions in the embodiments of this application with reference to the drawings in the embodiments of this application. Evidently, the described embodiments are merely a part of but not all of the embodiments of this application. All other embodiments derived by a person of ordinary skill in the art based on the embodiments of this application without making any creative efforts fall within the protection scope of this application.

Unless otherwise defined, all technical and scientific terms used herein have the same meanings as commonly understood by a person skilled in the technical field of this application. The terms used in the specification of this application are merely intended to describe specific embodiments but not intended to limit this application. The terms "include" and "contain" and any variations thereof used in the specification, claims, and brief description of drawings of this application are intended as non-exclusive inclusion. The terms such as "first" and "second" used in the specification, claims, and brief description of drawings herein are intended to distinguish between different items, but are not intended to describe a specific sequence or order of precedence.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments.

In the description of this application, unless otherwise expressly specified and defined, the terms "mount", "concatenate", "connect", and "attach" are understood in a broad sense. For example, a "connection" may be a fixed connection, a detachable connection, or an integrated connection; or may be a direct connection or an indirect connection implemented through an intermediary; or may be internal communication between two components. A person of ordinary skill in the art is able to understand the specific meanings of the terms in this application according to specific situations.

The term "and/or" in this application indicates merely a relation for describing the related items, and represents three possible relationships. For example, "A and/or B" may represent the following three circumstances: A alone, both A and B. and B alone. In addition, the character "/" herein generally indicates an "or" relationship between the item preceding the character and the item following the character.

In embodiments of this application, the same reference numeral denotes the same component. For brevity, detailed descriptions of the same component are omitted in a different embodiment. Understandably, dimensions such as thickness, length, and width of various components in the embodiments of this application shown in the drawings, and dimensions such as overall thickness, length, and width of an integrated device are merely illustrative descriptions, but do not constitute any limitation on this application.

"A plurality of" referred to in this application means two or more (including two).

In this application, a battery cell may include a lithium-ion secondary battery cell, a lithium-ion primary battery cell, a lithium-sulfur battery cell, a sodium-lithium-ion battery cell, a sodium-ion battery cell, a magnesium-ion battery cell, or the like. The embodiments of this application do not limit the type of the battery cell. The battery cell may be in a cylindrical shape, a flat shape, a cuboidal shape, or other shapes, without being limited in embodiments of this application.

The battery mentioned in embodiments of this application means a stand-alone physical module that includes one or more battery cells to provide a higher voltage and a higher capacity. For example, the battery mentioned in this application may include a battery module, a battery pack, or the like. A battery typically includes a box configured to package one or more battery cells. The box can prevent liquid or other foreign matters from affecting the charging or discharging of the battery cells.

A battery cell includes an electrode assembly and an electrolytic solution. The electrode assembly includes a positive electrode plate, a negative electrode plate, and a separator. The battery cell works primarily by shuttling metal ions between the positive electrode plate and the negative electrode plate. The positive electrode plate includes a positive current collector and a positive active material layer. The positive active material layer is applied onto a surface of the positive current collector. The positive current collector includes a positive coated region and a positive tab connected to the positive coated region. The positive coated region is coated with a positive active material layer, and the positive tab is not coated with the positive active material layer. Using a lithium-ion battery as an example, the positive current collector may be made of aluminum. The positive active material layer includes a positive active material. The positive active material may be lithium cobalt oxide, lithium iron phosphate, ternary lithium, lithium manganese oxide, or the like. The negative electrode plate includes a negative current collector and a negative active material layer. The negative active material layer is applied onto a surface of the negative current collector. The negative current collector includes a negative coated region and a negative tab connected to the negative coated region. The negative coated region is coated with a negative active material layer, and the negative tab is not coated with the negative active material layer. The negative current collector may be made of copper. The negative active material layer includes a negative active material. The negative active material may be carbon, silicon, or the like. The separator may be made of a material such as PP (polypropylene, polypropylene) or PE (polyethylene, polyethylene).

The battery cell further includes a housing and an end cap. An opening is made on the housing, and the housing is configured to accommodate the electrode assembly. The electrode assembly may be fitted into the housing through the opening of the housing. The end cap is configured to fit and cover the opening of the housing to implement sealing.

The development of the battery technology needs to allow for a plurality of design factors, including performance parameters such as energy density, cycle life, discharge capacity, charge rate, and discharge rate, and also needs to ensure safety of the battery.

The pressure relief mechanism on the battery cell is important to the safety of the battery cell. For example, in a case of a short circuit, overcharge, or the like, thermal runaway may occur inside the battery cell, resulting in a surge in pressure. In this case, the internal pressure may be released outward through the actuation of the pressure relief mechanism to prevent explosion and fire of the battery cell.

The pressure relief mechanism means an element or component that is actuated to release an internal pressure when the internal pressure of the battery cell reaches a preset threshold. The threshold varies depending on design requirements. The threshold may depend on the material of one or more of the positive electrode plate, the negative electrode plate, the electrolytic solution, or the separator in the battery cell.

The pressure relief mechanism may be in the form of an explosion-proof valve, a gas valve, a pressure relief valve, a safety valve, or the like, and may specifically be a pressure-sensitive element or structure. To be specific, when the internal pressure of the battery cell reaches a preset threshold, the pressure relief mechanism performs an action or a fragile portion disposed in the pressure relief mechanism is ruptured to form an opening or channel for releasing the internal pressure.

The term "actuated" mentioned in this application means that the pressure relief mechanism performs an action or is activated to a given state so that the internal pressure of the battery cell is released. The actions performed by the pressure relief mechanism may include, but are not limited to rupturing, shattering, tearing, or bursting open at least a part of the pressure relief mechanism, or the like. When the pressure relief mechanism is actuated, high-temperature and high-pressure substances inside the battery cell are expelled as emissions out of the actuated position. In this way, the pressure of the battery cell is released under a circumstance of a controllable pressure to avoid potential severer accidents.

The emissions out of the battery cell mentioned in this application include but are not limited to: electrolytic solution, melted or split positive and negative electrode plates, fragments of the separator, reaction-induced high-temperature and high-pressure gases, flames, and the like.

To simplify the structure of the battery cell, the inventor tried integrating a pressure relief mechanism onto an end cap. For example, the inventor disposes a fragile portion on the end cap. The end cap is configured to rupture along the fragile portion when an internal pressure of the battery cell reaches a threshold, so as to release the internal pressure. In a case of a short circuit, overcharge, or the like, thermal runaway may occur inside the battery cell, resulting in a surge in pressure. In this case, the internal pressure may be released outward by rupturing the fragile portion, so as to prevent the battery cell from exploding and catching fire, and improve safety.

However, after detecting a problem that a battery cell bursts prematurely to relieve pressure before the internal pressure reaches a preset threshold, the inventor analyzes and researches the structure and operating environment of the battery cell. The inventor finds that, in a case that the fatigue and aging occur prematurely on the fragile portion of the end cap, the threshold for bursting the end cap open is lowered, and the fragile portion of the end cap ruptures prematurely before the internal pressure of the battery cell reaches the original preset threshold. After further research, it is found that the internal pressure of the battery cell changes between high and low alternately during transportation, temperature changes, or charge-and-discharge cycles. Consequently, the end cap is prone to flip over back and forth. When the end cap flips over back and forth for a long term, fatigue and aging may occur in the fragile portion, thereby leading to a lower threshold for bursting the end cap open.

In view of this, an embodiment of this application provides a technical solution. In this technical solution, the end cap is fixed to a tab of an electrode assembly to restrict the flip-over of the end cap, reduce an alternating stress borne by the fragile portion, slow down the fatigue and aging of the fragile portion of the end cap, reduce the risk of premature rupture and pressure relief of the end cap, and help to improve the safety and stability of the battery cell.

The technical solution described in this embodiment of this application is applicable to a battery and an electrical device that uses the battery.

The electrical device may be a vehicle, a mobile phone, a portable device, a notebook computer, a ship, a spacecraft, an electric toy, a power tool, or the like. The vehicle may be an oil-fueled vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, such as a game console, an electric car toy, an electric ship toy, an electric airplane toy, and the like. The power tool includes an electrical metal cutting tool, an electrical grinding tool, an electrical assembling tool, and a power tool for use in railways. Examples of the power tool are an electrical drill, an electrical grinder, an electrical wrench, an electrical screwdriver, an electrical hammer, an electrical impact drill, a concrete vibrator, an electrical planer, and the like. The electrical device is not particularly limited in embodiments of this application.

For ease of description in the following embodiments, a vehicle is used as an example of the electrical device.

FIG. 1 is a schematic structural diagram of a vehicle according to some embodiments of this application. As shown in FIG. 1, a battery 2 is disposed inside the vehicle 1. The battery 2 may be disposed at the bottom, front, or rear of the vehicle 1. The battery 2 may be configured to supply power to the vehicle 1. For example, the battery 2 may serve as an operating power supply of the vehicle 1.

The vehicle 1 may further include a controller 3 and a motor 4. The controller 3 is configured to control the battery 2 to supply power to the motor 4, for example, to start or navigate the vehicle 1, or meet the operating power requirements of the vehicle in operation.

In some embodiments of this application, the battery 2 serves not only as an operating power supply of the vehicle 1, but may also serve as a drive power supply of the vehicle 1 to provide driving power for the vehicle 1 in place of or partly in place of oil or natural gas.

Figure 2:
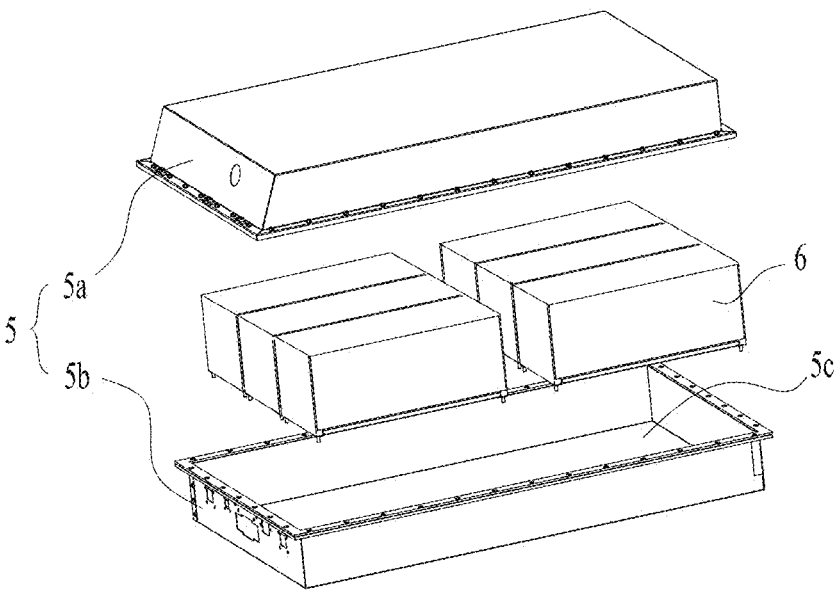
FIG. 2 is a schematic exploded view of a battery according to some embodiments of this application.

FIG. 2 is a schematic exploded view of a battery according to some embodiments of this application. As shown in FIG. 2, the battery 2 includes a box 5 and a battery cell. The battery cell is accommodated in the box 5.

The box 5 is configured to accommodate the battery cell. The box 5 may be one of various structures. In some embodiments, the box 5 may include a first box portion 5a and a second box portion 5b. The first box portion 5a and the second box portion 5b fit and cover each other. The first box portion 5a and the second box portion 5b together define an accommodation space 5c configured to accommodate the battery cell. The second box portion 5b may be a hollowed-out structure that is opened at one end. The first box portion 5a is a plate-like structure. The first box portion 5a fits on the opening side of the second box portion 5b to form the box 5 that includes the accommodation space 5c. The first box portion 5a and the second box portion 5b each may be a hollowed-out structure that is opened at one end. The opening end of the first box portion 5a fits on the opening end of the second box portion 5b, so as to form the box 5 with the accommodation space 5c. Definitely, the first box portion 5a and the second box portion 5b may be in various shapes, such as a cylinder or a cuboid.

To improve airtightness between the first box portion 5a and the second box portion 5b that are connected, a sealing element such as a sealant or a sealing ring may be disposed between the first box portion 5a and the second box portion 5b.

Assuming that the first box portion 5a fits on the top of the second box portion 5b, the first box portion 5a may also be referred to as an upper box, and the second box portion 5b may also be referred to as a lower box.

There may be one or more battery cells in the battery 2. If there are a plurality of battery cells, the plurality of battery cells may be connected in series, parallel, or series-and-parallel pattern. The series-and-parallel pattern means a combination of series connection and parallel connection of the plurality of battery cells. The plurality of battery cells may be directly connected in series, parallel, or series-and-parallel pattern, and then the whole of the plurality of battery cells may be accommodated in the box 5. Alternatively, the plurality of battery cells may be connected in series, parallel, or series-and-parallel pattern to form a battery module 6, and then a plurality of battery modules 6 are connected in series, parallel, or series-and-parallel pattern to form a whole for being accommodated in the box 5.

Figure 3:
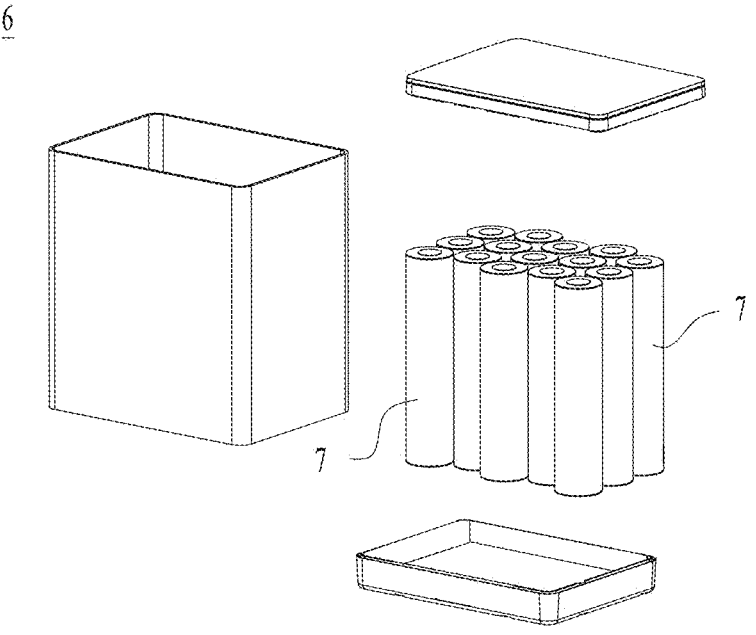
FIG. 3 is a schematic exploded view of the battery module shown in FIG. 2.

FIG. 3 is a schematic exploded view of the battery module shown in FIG. 2.

In some embodiments, as shown in FIG. 3, there are a plurality of battery cells 7. The plurality of battery cells 7 are connected in series, parallel, or series-and-parallel pattern to form a battery module 6 first. A plurality of battery modules 6 are then connected in series, parallel, or series-and-parallel pattern to form a whole for being accommodated in the box.

The plurality of battery cells 7 in the battery module 6 may be electrically connected by a busbar component, so as to implement parallel connection, series connection, or series-and-parallel connection between the plurality of battery cells 7 in the battery module 6.

Figure 4:
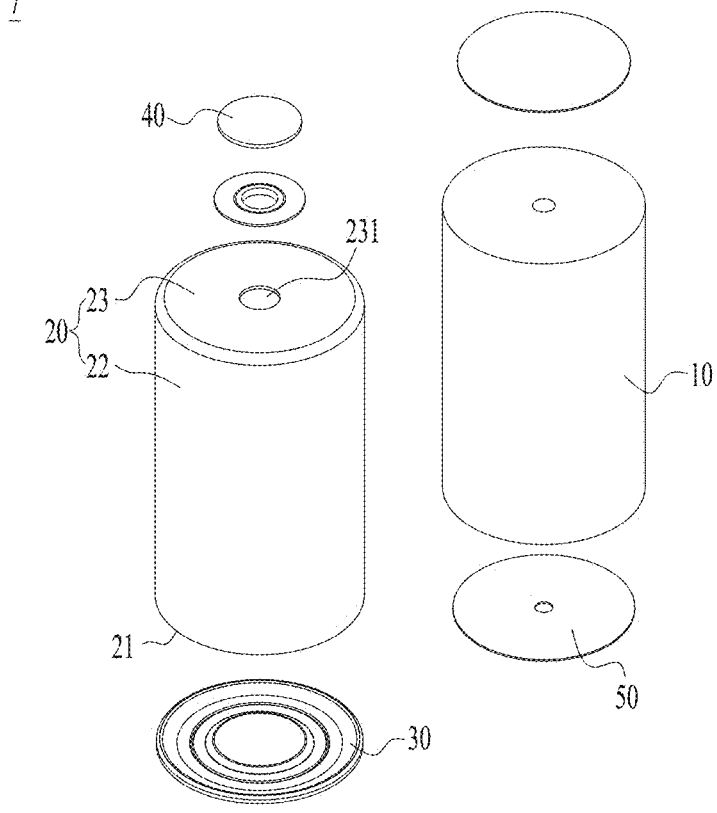
FIG. 4 is a schematic exploded view of a battery cell according to some embodiments of this application.
Figure 5:
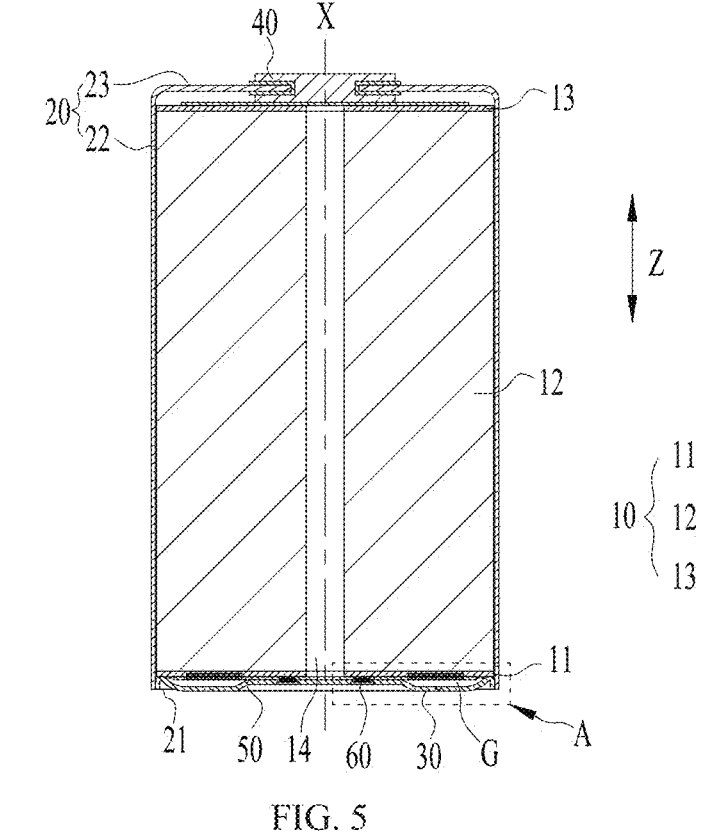
FIG. 5 is a schematic sectional view of a battery cell according to some embodiments of this application.

FIG. 4 is a schematic exploded view of a battery cell according to some embodiments of this application; FIG. 5 is a schematic sectional view of a battery cell according to some embodiments of this application; and FIG. 6 is a close-up view of a circled position A of the battery cell shown in FIG. 5.

Figure 6:
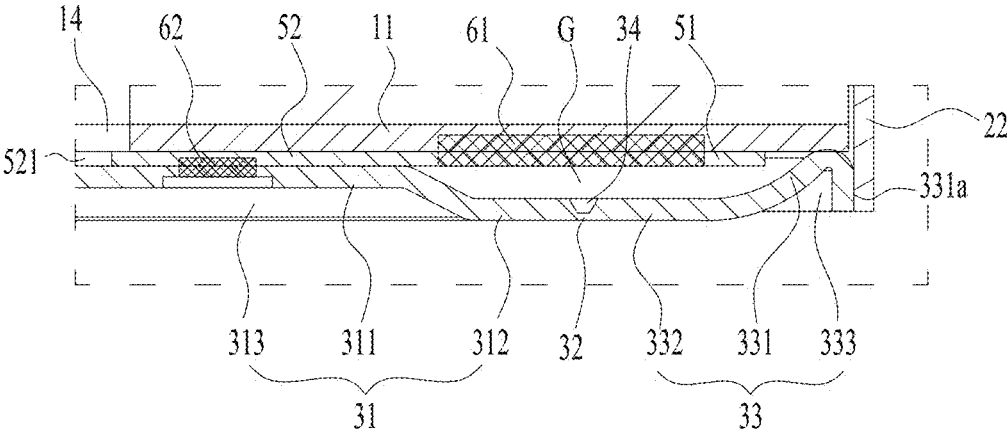
FIG. 6 is a schematic close-up view of a circled position A of the battery cell shown in FIG. 5.

As shown in FIG. 4 to FIG. 6, the battery cell 7 according to an embodiment of this application includes: a housing 20, on which an opening 21 is made; an electrode assembly 10, accommodated in the housing 20, where a first tab 11 is disposed on the electrode assembly 10 at an end oriented toward the opening 21; and an end cap 30, configured to fit and cover the opening 21, where the end cap 30 includes a first connecting portion 31 and a fragile portion 32. The fragile portion 32 is disposed along an edge of the first connecting portion 31. The end cap 30 is configured to rupture along the fragile portion 32 when an internal pressure of the battery cell 7 reaches a threshold, so as to release the internal pressure. The battery cell 7 further includes a fixing structure 60. The fixing structure 60 is configured to fixedly connect the first connecting portion 31 to the first tab 11, so as to restrict movement of the first connecting portion 31.

The electrode assembly 10 includes a first electrode plate, a second electrode plate, and a separator. The separator is configured to separate the first electrode plate from the second electrode plate. The first electrode plate and the second electrode plate are of opposite polarities. In other words, one of the first electrode plate or the second electrode plate is a positive electrode plate, and the other of the first electrode plate or the second electrode plate is a negative electrode plate.

Optionally, the first electrode plate, the second electrode plate, and the separator are all ribbon-shaped structures. The first electrode plate, the second electrode plate, and the separator are wound into one piece to form a jelly-roll structure. The jelly-roll structure may be a cylindrical structure, a flat structure, or other shaped structures.

Viewed from the appearance of the electrode assembly 10, the electrode assembly 10 includes a body portion 12, a first tab 11, and a second tab 13. The first tab 11 and the second tab 13 protrude from the body portion 12. The first tab 11 is a part uncoated with the active material layer on the first electrode plate, and the second tab 13 is a part uncoated with the active material layer on the second electrode plate. Correspondingly, one of the first tab 11 or the second tab 13 is a positive tab, and the other is a negative tab.

The first tab 11 and the second tab 13 may extend from the same end of the body portion 12, or extend from two opposite ends of the body portion respectively.

Illustratively, the first tab 11 and the second tab 13 are disposed at two ends of the body portion 12 respectively. In other words, the first tab 11 and the second tab 13 are disposed at the two ends of the electrode assembly 10 respectively. Optionally, the first tab 11 is located on the electrode assembly 10 at an end oriented toward the end cap 30. The second tab 13 is located on the electrode assembly 10 at an end oriented away from the end cap 30.

Optionally, the first tab 11 is wound around a central axis X of the electrode assembly 10 in a plurality of circles. In other words, the first tab 11 includes a plurality of tab layers. After completion of the winding, the first tab 11 is in the shape of a column approximately, and a gap is left between two adjacent tab layers. In this embodiment of this application, the first tab 11 may be processed to reduce the gap between the tab layers and facilitate the connection between the first tab 11 and other conductive structures. For example, in this embodiment of this application, the first tab 11 may be kneaded and flattened, so that an end region that is of the first tab 11 and that is far away from the body portion 12 can be tucked and collected together. The kneading and flattening lead to formation of a densified end face at the end that is of the first tab 11 and that is far away from the body portion 12, thereby reducing the gap between the tab layers and facilitating the connection between the first tab 11 and other conductive structures. Alternatively, in this embodiment of this application, a conductive material may fill the gap between the two adjacent tab layers to reduce the gap between the tab layers.

Optionally, the second tab 13 is wound around the central axis X of the electrode assembly 10 in circles, so that the second tab 13 includes a plurality of tab layers. Illustratively, the second tab 13 is also kneaded and flattened to reduce the gap between the tab layers of the second tab 13.

The housing 20 may be a hollowed-out structure opened at one end, or a hollowed-out structure opened at both ends. The end cap 30 fits on, and is hermetically connected to, the opening of the housing 20, to form an accommodation cavity configured to accommodate the electrode assembly and the electrolytic solution.

The housing 20 may be in various shapes such as a cylinder or cuboid. The shape of the housing 20 may be determined depending on the specific shape of the electrode assembly 10. For example, if the electrode assembly 10 is a cylindrical structure, the housing may be a cylindrical housing. If the electrode assembly 10 is a cuboidal structure, the housing may be a cuboidal housing.

Illustratively, the housing 20 includes a sidewall 22 and a bottom wall 23. The sidewall 22 surrounds the electrode assembly 10, and the bottom wall 23 is connected to an end of the sidewall 22. The sidewall 22 is a cylindrical structure. For example, the sidewall 22 is a cylinder or a rectangular column. The bottom wall 23 is a plate-like structure, the shape of which corresponds to the shape of the sidewall 22. Optionally, an opening 21 is formed at one end of the sidewall 22. The bottom wall 23 is connected to the other end that is of the sidewall 22 and that is oriented away from the opening 21.

The sidewall 22 and the bottom wall 23 may be an integrally formed structure. That is, the housing 20 is a one-piece member. Definitely, the sidewall 22 and the bottom wall 23 may be two stand-alone members provided separately, and may be connected together by welding, riveting, bonding, or other means.

The end cap 30 may be electrically connected to the electrode assembly 10, or may be insulated from the electrode assembly 10. Optionally, the end cap 30 is electrically connected to the first tab 11. Definitely, the end cap 30 may be directly electrically connected to the first tab 11, or may be electrically connected to the first tab 11 by other conductive members.

The end cap 30 is fixedly connected to the housing 20. For example, the end cap 30 may be connected to the housing 20 by welding, snap-fitting, bonding, or other means, so as to fix the end cap 30 onto the housing 20. The end cap 30 may be electrically connected to the housing 20, or may be dielectrically connected to the housing 20.

The housing 20 may be positively charged, negatively charged, or uncharged. To make the housing 20 charged, the housing 20 may be directly connected to the tab of the electrode assembly 10, or may be electrically connected to the tab through other conductive members (such as the end cap 30).

The end cap 30 and the housing 20 may be connected by welding, so that the end cap 30 and the housing 20 are of the same polarity. Illustratively, to make the housing 20 positively charged, the housing 20 may be electrically connected to the positive tab by using the end cap 30. To make the housing 20 negatively charged, the housing 20 may be electrically connected to the negative tab by using the end cap 30. Definitely, the housing 20 may be connected to the tab by other conductive structures instead, without being limited in this embodiment.

The housing 20 and the end cap 30 may be made of the same material, or made of different materials.

The strength of the fragile portion 32 is lower than the strength of other parts of the end cap 30. The fragile portion 32 is a part that is of the end cap 30 and that is prone to rupture, break, tear, or burst open. In this embodiment, the fragile portion 32 may be formed by thinning a preset region of the end cap 30, or the fragile portion 32 may be formed by treating the material in a preset region of the end cap 30, or the fragile portion 32 may be formed by a heat treatment in a preset region of the end cap 30, or the fragile portion 32 may be formed in a preset region of the end cap 30 by other means.

The fragile portion 32 extends along a circumferential direction of the first connecting portion 31 and is connected to the edge of the first connecting portion 31. Illustratively, the fragile portion 32 may surround the first connecting portion 31 by one circle, or may surround the first connecting portion by ½, ⅔, or ¾ circle, without being limited in this embodiment.

The fixing structure 60 may fixedly connect the first connecting portion 31 to the first tab 11 directly, or fixedly connect the first connecting portion 31 to the first tab 11 indirectly through other components.

The fixing structure 60 may be a weld portion formed by welding, or a bonding layer formed by curing a binder, or other structures, as long as the fixed connection can be implemented between the first tab 11 and the first connecting portion 31.

The fixing structure 60 may be a conductive structure to electrically connect the first connecting portion 31 to the first tab 11. Definitely, the fixing structure 60 may be an insulative structure instead, so as to insulate the first connecting portion 31 from the first tab 11.

The strength of the fixing structure 60 may be set as required. When the internal pressure of the battery cell 7 reaches a threshold, the fixing structure 60 can be ruptured by the internal pressure, so as to disconnect the first connecting portion 31 from the first tab 11. Definitely, the fixing structure 60 may possess relatively high strength instead. When the internal pressure of the battery cell 7 reaches the threshold, the fixing structure 60 can keep the connection between the first connecting portion 31 and the first tab 11.

The internal pressure of the battery cell may change between high and low alternately during transportation, temperature fluctuation, or charge-and-discharge cycles of the battery cell. Consequently, the end cap may deform by protruding away from the electrode assembly or by being recessed toward the electrode assembly. When the end cap is deformed by alternating protruding deformation and recessed deformation, the fragile portion bears an alternating stress, and therefore, may incur alternating fatigue and aging or break off, thereby decreasing strength of the fragile portion. Consequently, before the internal pressure of the battery cell reaches the preset threshold, the fragile portion is prone to rupture to release the internal pressure of the battery cell, thereby resulting in premature rupture and pressure relief of the end cap.

In this embodiment of this application, the first connecting portion 31 of the end cap 30 is fixedly connected to the first tab 11 of the electrode assembly 10 by the fixing structure 60. In this way, the first tab 11 of the electrode assembly 10 can restrict the movement of the first connecting portion 31 during the operation of the battery cell 7, thereby reducing the deformation and flipping of the end cap 30, reducing the alternating stress borne by the fragile portion 32, slowing down fatigue and aging of the fragile portion 32 of the end cap 30, reducing the risk of premature rupture and pressure relief of the end cap 30 during normal operation of the battery cell 7, and helping to improve safety and stability of the battery cell 7.

In some embodiments, the end cap 30 is a one-piece structure.

In some embodiments, the fragile portion 32 surrounds the first connecting portion 31 by one circle.

The fragile portion 32 is an annular structure around the first connecting portion 31, and in a shape corresponding to the profile of the first connecting portion 31. The first connecting portion 31 is located in a region enclosed by the fragile portion 32. Optionally, the region enclosed by the fragile portion 32 may be circular, rectangular, racetrack-shaped, or oval.

In this embodiment, the fragile portion 32 surrounds the first connecting portion 31 by one circle, thereby increasing the range of the fragile portion 32, increasing the degassing speed when the fragile portion 32 is ruptured, and improving the safety.

In some embodiments, the first connecting portion 31 is electrically connected to the first tab 11 by the fixing structure 60.

The fixing structure 60 is electrically conductive, and can implement electrical connection between the end cap 30 and the first tab 11.

In this embodiment, the end cap 30 may be electrified, and may serve as an output electrode of the battery cell 7, thereby saving a conventional electrode terminal and simplifying the structure of the battery cell 7.

In some embodiments, the end cap 30 is configured to electrically connect the first tab 11 to the housing 20.

In this embodiment, the housing 20 itself may serve as an output electrode of the battery cell 7. When a plurality of battery cells 7 are assembled into a group, the housing 20 may be electrically connected to a busbar component, thereby not only increasing the flow area, but also making the structural design of the busbar component more flexible.

In some embodiments, the housing 20 further includes a sidewall 22 and a bottom wall 23 connected to the sidewall 22. The sidewall 22 extends along the thickness direction Z of the end cap 30 and is disposed around the electrode assembly 10. An electrode lead-out hole 231 is disposed on the bottom wall 23. The electrode assembly 10 further includes a second tab 13 of a polarity opposite to the first tab 11. The second tab 13 is disposed on the electrode assembly 10 at an end oriented away from the opening 21. The battery cell 7 further includes an electrode terminal 40 mounted in the electrode lead-out hole 231, and the electrode terminal 40 is electrically connected to the second tab 13.

The second tab 13 may be directly electrically connected to the electrode terminal 40, or may be indirectly electrically connected to the electrode terminal 40 by other conductive structures.

The electrode terminal 40 is dielectrically disposed on the bottom wall 23. The electrode terminal 40 and the bottom wall 23 may be of different polarities. The electrode terminal 40 and the bottom wall 23 may serve as two output electrodes of the battery cell 7 respectively.

In a case that the first tab 11 is a negative tab and the second tab 13 is a positive tab, the bottom wall 23 is a negative output electrode of the battery cell 7, and the electrode terminal 40 is a positive output electrode of the battery cell 7. In a case that the first tab 11 is a positive tab and the second tab 13 is a negative tab, the bottom wall 23 is a positive output electrode of the battery cell 7, and the electrode terminal 40 is a negative output electrode of the battery cell 7.

The electrode terminal 40 is fixed onto the bottom wall 23. The electrode terminal 40 may be fixed as a whole onto the outer side of the bottom wall 23, or may extend into the interior of the housing 20 through the electrode lead-out hole 231.

The first tab 11 is located on the electrode assembly 10 at an end oriented toward the end cap 30, so as to facilitate electrical connection between the end cap 30 and the first tab 11. Correspondingly, the second tab 13 is located on the electrode assembly 10 at an end oriented toward the bottom wall 23, so as to facilitate electrical connection between the electrode terminal 40 and the second tab 13. In this embodiment of this application, the first tab 11 and the second tab 13 are disposed at the two ends of the electrode assembly 10 respectively, thereby reducing the risk of conduction between the first tab 11 and the second tab 13, and increasing the flow area of both the first tab 11 and the second tab 13.

In this embodiment, the bottom wall 23 and the electrode terminal 40 may serve as two output electrodes of the battery cell 7 respectively, thereby simplifying the structure of the battery cell 7 and ensuring a high flow capacity of the battery cell 7. The bottom wall 23 and the electrode terminal 40 are located at the same end of the battery cell 7. In this way, when a plurality of battery cells 7 are assembled in groups, the busbar component may be fitted onto the same side of the battery cell 7, thereby simplifying the assembling process and improving the assembling efficiency.

In some embodiments, the bottom wall 23 and the sidewall 22 are a one-piece structure. This embodiment avoids the step of connecting the bottom wall 23 and the sidewall 22. The housing 20 may be formed by a stretching process.

The electrode lead-out hole 231 in this embodiment of this application is made after the housing 20 is formed by stretching.

The inventor hereof has tried an opening end of a housing that is made by calendering, so that the opening end of the housing is folded inward to form a flanged structure. The flanged structure presses the end cap to fix the end cap. The inventor mounts the electrode terminal onto the end cap, and uses the flanged structure and the electrode terminal as the two output electrodes of the battery cell respectively. However, the larger the size of the flanged structure, the higher the risk of curling and wrinkling the flanged structure incurs after the flanged structure is formed. The curling and wrinkling of the flanged structure lead to a bumpy surface of the flanged structure and, when the flanged structure is welded to the busbar component, result in poor welding. Therefore, the size of the flanged structure is relatively limited, resulting in an insufficient flow capacity of the battery cell.

In this embodiment, an electrode lead-out hole 231 configured to mount the electrode terminal 40 is formed on the bottom wall 23 by a hole-opening process, so as to dispose the positive output electrode and the negative output electrode on the battery cell 7 at an end oriented away from the opening 21. The bottom wall 23 is formed during the formation of the housing 20, so as to ensure flatness of the bottom wall 23 and high connection strength between the bottom wall 23 and the busbar component after the electrode lead-out hole 231 is made. At the same time, the flatness of the bottom wall 23 is not restricted by the size of the bottom wall. Therefore, the size of the bottom wall 23 may be relatively large, thereby improving the flow capacity of the battery cell 7.

In some embodiments, the first tab 11 is a negative tab, and a substrate material of the housing 20 is steel.

The housing 20 is electrically connected to the negative tab. That is, the housing 20 is in a low-potential state. The steel housing 20 in the low-potential state is not prone to be corroded by an electrolytic solution, thereby reducing safety hazards.

In some embodiments, the housing 20 is welded to the end cap 30. The welding not only implements the connection between the housing 20 and the end cap 30, improves the flow capacity between the housing 20 and the end cap 30, but also ensures airtightness.

In some embodiments, the substrate material of the housing 20 is identical to the substrate material of the end cap 30. Optionally, both the substrate material of the housing 20 and the substrate material of the end cap 30 are steel.

In this embodiment, the substrate material of the housing 20 is identical to the substrate material of the end cap 30, thereby ensuring sufficient welding strength between the housing 20 and the end cap 30, and ensuring the airtightness of the battery cell 7.

In some embodiments, the battery cell 7 is a cylindrical cell. Correspondingly, the electrode assembly 10 is a cylindrical structure, and the housing 20 is a cylindrical hollowed-out structure.

In some embodiments, the fixing structure 60 is configured to be at least partly broken when the internal pressure of the battery cell 7 reaches the threshold, so as to disconnect the first connecting portion 31 from the first tab 11.

When the battery cell 7 is thermally runaway, the electrode assembly 10 generates high-temperature and high-pressure gas, and the internal pressure of the battery cell 7 rises with the increase of the gas. The end cap 30 is deformed by the gas pressure and exerts a pulling force on the fixing structure 60. When the internal pressure of the battery cell 7 reaches a threshold, the end cap 30 snaps off the fixing structure 60 under the gas pressure, so as to cut off the fixed connection between the first connecting portion 31 and the first tab 11.

The order between the rupture of the fixing structure 60 and the rupture of the fragile portion 32 is not limited in this embodiment, as long as both the fixing structure 60 and the fragile portion 32 can be ruptured when the internal pressure of the battery cell 7 reaches the threshold.

In this embodiment, after the first connecting portion 31 is disconnected from the first tab 11, the first tab 11 no longer limits the movement of the first connecting portion 31. With the rupture of the fragile portion 32, the first connecting portion 31 can be burst open by the gas pressure to enlarge the channel configured to release the internal pressure, thereby quickly releasing the internal pressure and improving the safety.

Illustratively, the fragile portion 32 surrounds the first connecting portion 31 by one circle. After the fragile portion 32 is ruptured, the first connecting portion 31 is disconnected from other parts of the end cap 30. In this way, the first connecting portion 31 is burst open by the gas pressure and detached from the battery cell 7. Alternatively, the fragile portion 32 may surround the first connecting portion 31 by less than one circle. With the rupture of the fragile portion 32, the first connecting portion 31 still keeps connected to other parts of the end cap 30. However, the first connecting portion 31 is flipped outward by the gas pressure, so as to enlarge the channel configured to release the internal pressure.

In some embodiments, the battery cell 7 further includes a current collecting member 50 disposed between the end cap 30 and the first tab 11. The current collecting member 50 is configured to connect the first connecting portion 31 to the first tab 11 to implement electrical connection between the end cap 30 and the first tab 11. The fixing structure 60 includes a first fixing structure 61 and a second fixing structure 62. The first fixing structure 61 is a weld portion formed by welding one part of the current collecting member 50 to the first tab 11. The second fixing structure 62 is a weld portion formed by welding another part of the current collecting member 50 to the first connecting portion 31.

One part of the current collecting member 50 is connected to the first tab 11 by welding to implement electrical connection between the current collecting member 50 and the first tab 11. Another part of the current collecting member 50 is connected to the first connecting portion 31 by welding to implement electrical connection between the current collecting member 50 and the end cap 30.

The current collecting member 50 may include other parts in addition to the part welded to the first tab 11 and the other part welded to the first connecting portion 31.

Through research, the inventor finds that an end face of the first tab 11, which is oriented toward the end cap 30, is bumpy and can hardly closely fit the first connecting portion 31. If the first connecting portion 31 and the first tab 11 are welded together directly, the first connecting portion 31 may generate microcracks, bring the risk of sealing failure of the end cap 30, and result in safety hazards.

In this embodiment, the current collecting member 50 is an independently formed member. Different from the first tab 11 formed by winding, the shape of the current collecting member 50 is adaptable to the shape of the end cap 30 to ensure the close fitting of the current collecting member 50 to the first connecting portion 31 of the end cap 30.

In this embodiment, the current collecting member 50 is disposed in the battery cell 7, and the current collecting member 50 is welded to the first connecting portion 31 and the first tab 11 separately to implement electrical connection between the end cap 30 and the first tab 11. The current collecting member 50 may fit the first connecting portion 31 closely to reduce the risk of generating microcracks on the first connecting portion 31, improve sealing performance, and reduce safety hazards. When the current collecting member 50 is welded to the first tab 11, even if microcracks occur on the current collecting member 50, the airtightness of the battery cell 7 is not affected.

In this embodiment, the first fixing structure 61 and the second fixing structure 62 can fixedly connect the first connecting portion 31, the current collecting member 50, and the first tab 11 to restrict the movement of the first connecting portion 31.

In some embodiments, the current collecting member 50 includes a first current collecting portion 51 and a second current collecting portion 52. The first current collecting portion 51 surrounds the second current collecting portion 52. The first fixing structure 61 is a weld portion formed by welding the first current collecting portion 51 to the first tab 11. The second fixing structure 62 is a weld portion formed by welding the second current collecting portion 52 to the first connecting portion 31.

The first current collecting portion 51 is an annular structure around the second current collecting portion 52. Optionally, a part of the current collecting member 50, which is in contact with the first connecting portion 31, is the second current collecting portion 52, and a part of the current collecting member 50, which is not in contact with the first connecting portion 31, is the first current collecting portion 51.

The first fixing structure 61 is located outside the second fixing structure 62. That is, the first fixing structure 61 is closer to the sidewall 22 of the housing 20 than the second fixing structure 62.

The first fixing structure 61 and the second fixing structure 62 are structures formed by melting, cooling, and solidifying the materials or by other processes, and are bumpy and rough on the surfaces.

During assembling of the battery cell 7, the current collecting member 50 is pressed against and welded to the first tab 11 to form the first fixing structure 61 first, and then the first connecting portion 31 is welded to the current collecting member 50 to form the second fixing structure 62. If the second fixing structure 62 and the first fixing structure 61 overlap along the thickness direction Z of the end cap 30, the part of the first connecting portion 31, which is to be welded to the current collecting member 50, needs to be pressed against the first fixing structure 61 during welding between the first connecting portion 31 and the current collecting member 50. Because the surface of the first fixing structure 61 is bumpy and rough, if the part of the first connecting portion 31, which is to be welded to the current collecting member 50, is pressed against the first fixing structure 61, the first connecting portion 31 can hardly fit the first fixing structure 61 closely, thereby resulting in poor welding, impairing the connection strength between the first connecting portion 31 and the current collecting member 50, and bringing the risk of generating microcracks on the first connecting portion 31.

In this embodiment, the first fixing structure 61 and the second fixing structure 62 are formed on the first current collecting portion 51 and the second current collecting portion 52 respectively. In this way, the first fixing structure 61 is prevented from affecting the welding between the first connecting portion 31 and the current collecting member 50, and the connection strength between the first connecting portion 31 and the current collecting member 50 is increased.

In some embodiments, the second fixing structure 62 is configured to be broken when the internal pressure of the battery cell 7 reaches the threshold, so as to disconnect the second current collecting portion 52 from the first connecting portion 31.

When the battery cell 7 is thermally runaway, the electrode assembly 10 generates high-temperature and high-pressure gas, and the internal pressure of the battery cell 7 rises with the increase of the gas. The end cap 30 is deformed by the gas pressure and exerts a pulling force on the second fixing structure 62. When the internal pressure of the battery cell 7 reaches a threshold, the end cap 30 snaps off the second fixing structure 62 under the gas pressure, so as to cut off the fixed connection between the first connecting portion 31 and the second current collecting portion 52.

After the first connecting portion 31 is disconnected from the second current collecting portion 52, the first tab 11 no longer restricts the movement of the first connecting portion 31 through the current collecting member 50. With the rupture of the fragile portion 32, the first connecting portion 31 can be burst open by gas pressure to enlarge a channel configured to release the internal pressure, thereby quickly releasing the internal pressure and improving the safety.

In some embodiments, when the internal pressure of the battery cell 7 reaches the threshold, the first fixing structure 61 keeps the connection between the first tab 11 and the first current collecting portion 51 to fix the current collecting member 50 and reduce the risk that the current collecting member 50 blocks the channel configured to release the internal pressure.

In some embodiments, the connection strength between the second current collecting portion 52 and the first connecting portion 31 is less than the connection strength between the first current collecting portion 51 and the first tab 11.

The connection strength between the second current collecting portion 52 and the first connecting portion 31 may be represented by tensile strength of the second fixing structure 62. The connection strength between the first current collecting portion 51 and the first tab 11 may be represented by tensile strength of the first fixing structure 61. The tensile strength of the first fixing structure 61 and the tensile strength of the second fixing structure 62 may be measured by using a tensile testing machine. For example, a measurement process is: fixing the electrode assembly 10 onto a jig, pulling the current collecting member 50 with a tensile testing machine until the first fixing structure 61 is snapped off and the first tab 11 of the electrode assembly 10 is detached from the current collecting member 50, and calculating the tensile strength of the first fixing structure 61 based on the measured data. The tensile strength of the second fixing structure 62 may be measured in the same way.

When the battery cell 7 is thermally runaway, the end cap 30 exerts a pulling force on the current collecting member 50 and the first tab 11 under the action of gas pressure. The connection strength between the second current collecting portion 52 and the first connecting portion 31 is less than the connection strength between the first current collecting portion 51 and the first tab 11, and therefore, the current collecting member 50 is detached from the first connecting portion 31 first. After the current collecting member 50 is detached from the first connecting portion 31, the current collecting member 50 no longer receives the pulling force of the end cap 30, thereby keeping the fixed connection between the current collecting member 50 and the first tab 11, and reducing the risk that the current collecting member 50 blocks the channel configured to release the internal pressure.

In some embodiments, the first connecting portion 31 includes a first protruding portion 311 and a first plate body 312 around the first protruding portion 311. The first protruding portion 311 protrudes from an inner surface of the first plate body 312 toward the electrode assembly 10. A first recessed portion 313 is formed on the first connecting portion 31 at a position corresponding to the first protruding portion 311, where the first recessed portion is recessed from an outer surface of the first plate body 312 toward the electrode assembly 10. The fragile portion 32 is located on an outer side of the first plate body 312 and arranged along an outer edge of the first plate body 312. The second current collecting portion 52 abuts on and is welded to the first protruding portion 311 to form the second fixing structure 62.

The first plate body 312 may be an annular flat plate structure, and includes an inner surface and an outer surface that are disposed opposite to each other along the thickness direction Z. The inner surface of the first plate body 312 faces the electrode assembly 10. The first protruding portion 311 protrudes from the fragile portion 32 toward the electrode assembly 10.

The first recessed portion 313 can reduce the strength of the first protruding portion 311 and increase elasticity of the first protruding portion 311. In this way, when the battery cell 7 vibrates, the first protruding portion 311 can deform to release the stress, reduce the stress transmitted to the fragile portion 32, and slow down the fatigue and aging of the fragile portion 32. The first recessed portion 313 can further reduce the thickness of the first protruding portion 311, reduce the energy required for welding the first protruding portion 311 to the second current collecting portion 52, reduce the heat transferred to the fragile portion 32, and slow down the fatigue and aging of the fragile portion 32.

In some embodiments, the first current collecting portion 51 overlays the fragile portion 32 in the thickness direction Z of the end cap 30.

A projection of the fragile portion 32 along the thickness direction Z is located within a projection of the first current collecting portion 51 along the thickness direction Z.

In this embodiment, the current collecting member 50 can separate the fragile portion 32 from the first tab 11, so as to reduce active particles dropping onto the fragile portion 32 from the electrode assembly 10 and reduce the risk of corroding the fragile portion 32.

In some embodiments, the first protruding portion 311 supports the current collecting member 50 so that an avoidance clearance G configured to avoid the fragile portion 32 is formed between the first current collecting portion 51 and the end cap 30.

The avoidance clearance G is a space formed between the first current collecting portion 51 and the end cap 30 and unfilled with other solid members. The avoidance clearance G is opposite to the fragile portion 32 along the thickness direction Z, and therefore, serves to avoid the fragile portion 32.

The first connecting portion 31 supports the first tab 11 through the current collecting member 50, thereby reducing the shaking amplitude of the electrode assembly 10 during vibration of the battery cell 7, and improving stability of the electrode assembly 10. The avoidance clearance G can separate the fragile portion 32 from the first current collecting portion 51, so that it is avoided that the channel configured to release the internal pressure is blocked by the first current collecting portion 51 when the fragile portion 32 is ruptured, thereby improving safety.

In some embodiments, the electrode assembly 10 is a jelly-roll structure, and a first through-hole 14 is made at a winding center of the electrode assembly 10. A second through-hole 521 is made in the second current collecting portion 52. The second through-hole 521 is disposed opposite to the first through-hole 14 and configured to guide the gas in the electrode assembly 10 to the first connecting portion 31.

In the thickness direction Z, the first through-hole 14 and the second through-hole 521 at least partly overlap to implement communication between the first through-hole 14 and the second through-hole 521.

When the electrode assembly 10 is thermally runaway, the high-temperature and high-pressure gas can act on the first connecting portion 31 through the first through-hole 14 and the second through-hole 521, thereby quickly disconnecting the first connecting portion 31 from the current collecting member 50.

In some embodiments, the end cap 30 further includes a second connecting portion 33. The second connecting portion 33 surrounds the first connecting portion 31 and is configured to be fixedly connected to the housing 20. The fragile portion 32 is located between the first connecting portion 31 and the second connecting portion 33 and configured to connect the first connecting portion 31 and the second connecting portion 33.

The second connecting portion 33 may be connected to the housing 20 by welding, snap-fitting, bonding, or other means, so as to fix the end cap 30 onto the housing 20. The second connecting portion 33 may be electrically connected to the housing 20, or may be dielectrically connected to the housing 20.

The strength of the second connecting portion 33 is greater than the strength of the fragile portion 32. For example, the thickness of the second connecting portion 33 is greater than the thickness of the fragile portion 32.

In this embodiment, the end cap 30 is fixed to the housing 20 by the second connecting portion 33 around the fragile portion 32, so as to increase the spacing between the fragile portion 32 and the housing 20, reduce the stress transmitted to the fragile portion 32, and slow down the fatigue and aging of the fragile portion 32.

In some embodiments, the fragile portion 32 is configured to rupture to disconnect the first connecting portion 31 from the second connecting portion 33 when the internal pressure of the battery cell 7 reaches the threshold.

In this embodiment, after the first connecting portion 31 is disconnected from the second connecting portion 33, the first connecting portion 31 and the second connecting portion 33 can be flipped outward by the internal pressure, so as to enlarge the channel configured to release the internal pressure, quickly release the internal pressure, and improve safety.

Illustratively, the end cap 30 electrically connects the housing 20 to the first tab 11, and the housing 20 may serve as an output electrode of the battery cell 7. The fragile portion 32 is ruptured to disconnect the first connecting portion 31 from the second connecting portion 33 when the internal pressure of the battery cell 7 reaches the threshold, thereby disconnecting the electrode assembly 10 from an external circuit, stopping charging or discharging, slowing down the gassing of the electrode assembly 10, and improving safety.

Illustratively, the fixing structure 60 is configured to be at least partly broken when the internal pressure of the battery cell 7 reaches the threshold, so as to disconnect the first connecting portion 31 from the first tab 11. At the same time, with the rupture of the fragile portion 32, the first connecting portion 31 is detached from the second connecting portion 33 by the gas pressure, so as to enlarge the channel configured to release the internal pressure, quickly release the internal pressure, and improve safety.

In some embodiments, the second connecting portion 33 includes a second plate body 332 and a second protruding portion 331 around the second plate body 332. The second protruding portion 331 protrudes from an inner surface of the second plate body 332 toward the electrode assembly 10. A second recessed portion 333 is formed on the second connecting portion 33 at a position corresponding to the second protruding portion 331, where the second recessed portion is recessed from an outer surface of the second plate body 332 toward the electrode assembly 10. The second plate body 332 surrounds the fragile portion 32, and the second protruding portion 331 is configured to be fixedly connected to the housing 20.

The second plate body 332 may be an annular flat plate structure, and includes an inner surface and an outer surface that are disposed opposite to each other along the thickness direction Z. The inner surface of the second plate body 332 faces the electrode assembly 10.

The second protruding portion 331 protrudes from the fragile portion 32 toward the electrode assembly 10.

Optionally, the second plate body 332 and the current collecting member 50 at least partly overlap in the thickness direction Z.

The second recessed portion 333 can reduce the strength of the second protruding portion 331 and increase elasticity of the second protruding portion 331. In this way, when the battery cell 7 vibrates, the stress on the housing 20 is transmitted to the second protruding portion 331. The second protruding portion 331 can deform to release the stress, reduce the stress transmitted to the fragile portion 32, and slow down the fatigue and aging of the fragile portion 32.

Illustratively, the fragile portion 32 is located between the first plate body 312 and the second plate body 332 to connect the first plate body 312 and the second plate body 332.

In some embodiments, an outer side face 331a of the second protruding portion 331 abuts on an inner surface of the housing 20 and is configured to be welded to the housing 20 to close the opening 21.

The outer side face 331a of the second protruding portion 331 is a surface of the second protruding portion 331, where the surface is oriented toward the sidewall 22 of the housing 20. The outer side face 331a of the second protruding portion 331 is a column face. Optionally, the outer side face 331a of the second protruding portion 331 is a cylindrical face.

The part of the second protruding portion 331, which protrudes into the housing 20, may be in interference fit, transition fit, or clearance fit with the housing 20. Optionally, the part of the second protruding portion 331, which protrudes into the housing 20, may be in interference fit with the housing 20. The interference fit increases connection strength between the housing 20 and the end cap 30, and improves the sealing performance.

Optionally, the second protruding portion 331 and the sidewall 22 of the housing 20 are connected by laser welding. During the welding, a laser beam is radiated on a junction between the second protruding portion 331 and the sidewall 22. The laser beam melts and connects together at least a part of the outer side face 331a of the second protruding portion 331 and a part of the inner surface of the housing 20. The outer side face 331a of the second protruding portion 331 abuts on the inner surface of the housing 20, thereby reducing the risk of burning the electrode assembly 10 by the laser beam radiated into the housing 20.

Alternatively, the laser beam may be radiated on an outer surface of the sidewall 22, where the outer surface is oriented away from the second protruding portion 331.

In this embodiment, the sealing is implemented by welding, so as to reduce the risk of leaking an electrolytic solution, and increase the connection strength and flow capacity between the second protruding portion 331 and the housing 20.

The second recessed portion 333 can reduce the strength of the second protruding portion 331 and increase elasticity of the second protruding portion 331. In this way, during welding between the second protruding portion 331 and the housing 20, the second protruding portion 331 can deform to release the welding stress, thereby reducing the risk of deformation and cracking of a weld region, reducing the welding stress transmitted to the fragile portion 32, and improving safety.

In some embodiments, the second protruding portion 331 abuts on the first tab 11 to support the first tab 11.

In this embodiment, the second protruding portion 331 supports the first tab 11, thereby reducing the shaking amplitude of the electrode assembly 10 during vibration of the battery cell 7, and improving stability of the electrode assembly 10.

The current collecting member 50 supports a middle region of the first tab 11, and the second protruding portion 331 supports an edge region of the first tab 11, thereby improving uniformity of the force on the first tab 11 and reducing the risk of offset and misalignment of the electrode plate of the electrode assembly 10 in the thickness direction Z.

When the first connecting portion 31 is detached from the battery cell 7 by the gas pressure, the second protruding portion 331 can support the first tab 11 and the current collecting member 50 to reduce the risk that the current collecting member 50 blocks the channel configured to release the internal pressure, ensure smooth degassing, and improve safety.

Figures 7, 8:
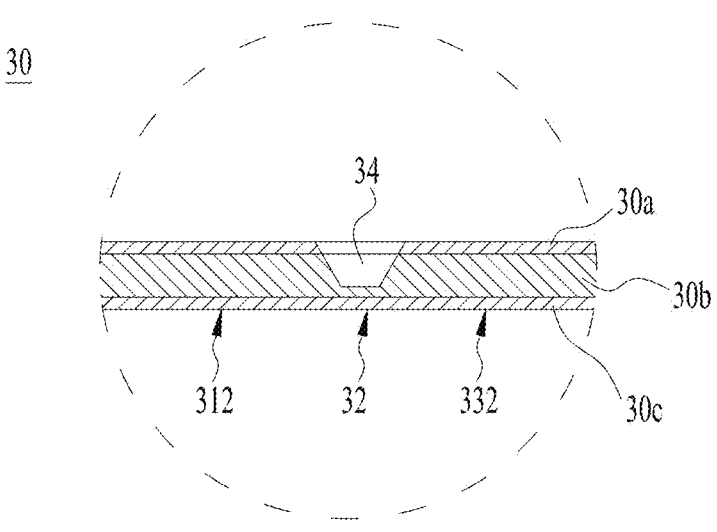
FIG. 7 is a local schematic sectional view of the end cap shown in FIG. 4.
FIG. 8 is a schematic sectional view of a battery cell according to other embodiments of this application.

FIG. 7 is a local schematic sectional view of the end cap shown in FIG. 4.

As shown in FIG. 7, in some embodiments, a groove 34 is made on the end cap 30. The fragile portion 32 is formed in a region corresponding to the groove 34 on the end cap 30.

The thickness of the fragile portion 32 is less than the thickness of the first connecting portion, so that the strength of the fragile portion 32 is less than the strength of the first connecting portion.

Illustratively, the groove 34 may be formed mechanically by removing a part of material from the end cap 30, thereby helping to reduce cost and difficulty of processing. Along the thickness direction of the end cap 30, the fragile portion 32 is disposed corresponding to the groove 34.

The groove 34 may be disposed on the inner surface of the end cap 30, and the fragile portion 32 is a part of the end cap 30, where the part is located between the bottom face of the groove 34 and the outer surface of the end cap 30. Alternatively, the groove 34 may be disposed on the outer surface of the end cap 30, and the fragile portion 32 is a part of the end cap 30, where the part is located between the bottom face of the groove 34 and the inner surface of the end cap 30.

Illustratively, the inner surface of the end cap 30 includes the inner surface of the first plate body 312 and the inner surface of the second plate body 332, and the outer surface of the end cap 30 includes the outer surface of the first plate body 312 and the outer surface of the second plate body 332. The inner surface of the first plate body 312 is flush with the inner surface of the second plate body 332, and the outer surface of the first plate body 312 is flush with the outer surface of the second plate body 332. The groove 34 is located between the first plate body 312 and the second plate body 332.

In this embodiment, the thickness and strength of the fragile portion 32 are reduced by the groove 34, so that the end cap 30 can be ruptured along the fragile portion 32 when the internal pressure of the battery cell 7 reaches the threshold.

In some embodiments, the end cap 30 includes a first nickel layer 30a, a steel layer 30b, and a second nickel layer 30c. The first nickel layer 30a is disposed on a surface that is of the steel layer 30b and that is oriented toward the first tab. The second nickel layer 30c is disposed on a surface that is of the steel layer 30b and that is oriented away from the first tab. The groove 34 is recessed toward the second nickel layer 30c from a surface that is of the first nickel layer 30a and that is oriented away from the steel layer 30b. A depth of the groove 34 is greater than a thickness of the first nickel layer 30a and less than a sum of the thickness of the first nickel layer 30a and a thickness of the steel layer 30b.

The surface that is of the first nickel layer 30a and that is oriented away from the steel layer 30b is the inner surface of the end cap 30, and the surface that is of the second nickel layer 30c and that is oriented away from the steel layer 30b is the outer surface of the end cap 30.

The end cap 30 is made of a composite metal sheet. The first nickel layer 30a and the second nickel layer 30c serve to protect the steel layer 30b, reduce the risk of corroding the steel layer 30b by water, oxygen, and other substances, and improve airtightness.

Both the thickness of the first nickel layer 30a and the thickness of the second nickel layer 30c are less than the thickness of the steel layer 30b.

The first nickel layer 30a and the second nickel layer 30c primarily serve a function of resisting corrosion, and may be relatively thin. The steel layer 30b is a base structure of the end cap 30, and may be relatively thick.

In this embodiment, the groove 34 is located on the inner side of the end cap 30, thereby avoiding damage to the external second nickel layer 30c during formation. Therefore, the second nickel layer 30c can protect the steel layer 30b from outside, so as to reduce the risk of corroding the steel layer 30b. The steel layer 30b itself is not prone to be corroded by the electrolytic solution. Therefore, even if exposing the steel layer 30b, the groove 34 is not prone to give rise to safety hazards.

FIG. 8 is a schematic sectional view of a battery cell according to other embodiments of this application; and FIG. 9 is schematic close-up view of a rectangular position B of the battery cell shown in FIG. 8.

As shown in FIG. 8 and FIG. 9, in some embodiments, the fixing structure 60 is a weld portion formed by welding the first tab 11 to the first connecting portion 31.

In this embodiment, the first connecting portion 31 is directly connected to the first tab 11 by welding, thereby simplifying the structure of the battery cell 7, for example, saving the current collecting member.

FIG. 10 is a schematic flowchart of a method for manufacturing a battery cell according to some embodiments of this application.

As shown in FIG. 10, the method for manufacturing a battery cell according to an embodiment of this application includes the following steps:

S100: Providing a housing, where an opening is made on the housing;

S200: Providing an electrode assembly, and mounting the electrode assembly into the housing, where a first tab is disposed on the electrode assembly at an end oriented toward the opening;

S300: Providing an end cap, and connecting the end cap to the housing so that the end cap fits and covers the opening, where the end cap includes a first connecting portion and a fragile portion, and the fragile portion is disposed along an edge of the first connecting portion; and S400. Connecting the first connecting portion to the first tab fixedly to form a fixing structure, so as to restrict movement of the first connecting portion.

The end cap is configured to rupture along the fragile portion when an internal pressure of the battery cell reaches a threshold, so as to release the internal pressure.

It is hereby noted that, for the related structure of the battery cell manufactured by the foregoing method for manufacturing a battery cell, refer to the descriptions of the battery cells provided in the foregoing embodiments.

Figure 11:
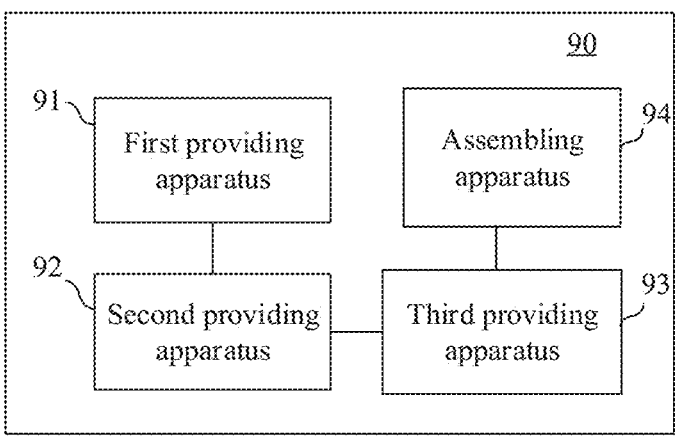
FIG. 11 is a schematic block diagram of a system for manufacturing a battery cell according to some embodiments of this application.

FIG. 11 is a schematic block diagram of a system for manufacturing a battery cell according to some embodiments of this application.

As shown in FIG. 11, the system 90 for manufacturing a battery cell according to an embodiment of this application includes:

a first providing apparatus 91, configured to provide a housing, where an opening is made on the housing;

a second providing apparatus 92, configured to provide an electrode assembly, and mount the electrode assembly into the housing, where a first tab is disposed on the electrode assembly at an end oriented toward the opening;

a third providing apparatus 93, configured to provide an end cap, and connect the end cap to the housing so that the end cap fits and covers the opening, where the end cap includes a first connecting portion and a fragile portion, and the fragile portion is disposed along an edge of the first connecting portion; and an assembling apparatus 94, configured to connect the first connecting portion to the first tab fixedly to form a fixing structure, so as to restrict movement of the first connecting portion.

The end cap is configured to rupture along the fragile portion when an internal pressure of the battery cell reaches a threshold, so as to release the internal pressure.

For the related structures of the battery cells manufactured by the foregoing manufacturing system, refer to the descriptions of the battery cells provided in the foregoing embodiments.

It is hereby noted that to the extent that no conflict occurs, the embodiments of this application and the features in the embodiments may be combined with each other.

Finally, it is hereby noted that the foregoing embodiments are merely intended to describe the technical solutions of this application but not to limit this application. Although this application has been described in detail with reference to the foregoing embodiments, a person of ordinary skill in the art understands that modifications may still be made to the technical solutions described in the foregoing embodiments, or equivalent replacements may still be made to some technical features in the technical solutions. Such modifications and replacements do not make the essence of the corresponding technical solutions depart from the spirit and scope of the technical solutions of the embodiments of this application.

What is claimed is:

1. A battery cell, comprising:
a housing having an opening;
an electrode assembly, accommodated in the housing, wherein a first tab is disposed on the electrode assembly at an end oriented toward the opening; and
an end cap to fit and cover the opening, wherein the end cap comprises a first connector and a rupturable structure, the rupturable structure is disposed along an edge of the first connector, and the end cap ruptures along the rupturable structure when an internal pressure of the battery cell reaches a threshold, so as to release the internal pressure, wherein
the battery cell further comprises a fixing structure to fixedly connect the first connector to the first tab, so as to restrict movement of the first connector, and
the first connector comprises a first protruding structure and a first plate body around the first protruding structure, the first protruding structure protrudes from an inner surface of the first plate body toward the electrode assembly, and a first recess is formed on the first connector at a position corresponding to the first protruding structure, wherein the first recess is recessed from an outer surface of the first plate body toward the electrode assembly.

2. The battery cell according to claim 1, wherein the first connector is electrically connected to the first tab by the fixing structure.

3. The battery cell according to claim 1, wherein the fixing structure is at least partly broken when the internal pressure of the battery cell reaches the threshold, so as to disconnect the first connector from the first tab.

4. The battery cell according to claim 1, wherein the fixing structure is a weld structure formed by welding the first tab to the first connector.

5. The battery cell according to claim 1, further comprising a current collecting structure disposed between the end cap and the first tab, wherein the current collecting structure connects the first connector to the first tab to implement electrical connection between the end cap and the first tab; and
the fixing structure comprises a first fixing structure and a second fixing structure, the first fixing structure is a weld structure formed by welding one part of the current collecting structure to the first tab, and the second fixing structure is a weld structure formed by welding the other part of the current collecting structure to the first connector.

6. The battery cell according to claim 5, wherein
the current collecting structure comprises a first current collecting structure and a second current collecting structure, the first current collecting structure surrounds the second current collecting structure, the first fixing structure is a weld structure formed by welding the first current collecting structure to the first tab, and the second fixing structure is a weld structure formed by welding the second current collecting structure to the first connector.

7. The battery cell according to claim 6, wherein the second fixing structure is broken when the internal pressure of the battery cell reaches the threshold, so as to disconnect the second current collecting structure from the first connector.

8. The battery cell according to claim 6, wherein connection strength between the second current collecting structure and the first connector is less than connection strength between the first current collecting structure and the first tab.

9. The battery cell according to claim 6, wherein
the rupturable structure is located on an outer side of the first plate body and arranged along an outer edge of the first plate body; and
the second current collecting structure abuts on and is welded to the first protruding structure to form the second fixing structure.

10. The battery cell according to claim 9, wherein the first current collecting structure overlays the rupturable structure in a thickness direction of the end cap.

11. The battery cell according to claim 9, wherein the first protruding structure supports the current collecting structure so that an avoidance clearance configured to avoid the rupturable structure is formed between the first current collecting structure and the end cap.

12. The battery cell according to claim 6, wherein the electrode assembly is a jelly-roll structure, and a first through-hole is disposed at a winding center of the electrode assembly; and
a second through-hole is disposed in the second current collecting structure, and the second through-hole is disposed opposite to the first through-hole to guide gas in the electrode assembly to the first connector.

13. The battery cell according to claim 1, wherein the end cap further comprises a second connector, and the second connector surrounds the first connector and is fixedly connected to the housing; and
the rupturable structure is located between the first connector and the second connector and connects the first connector and the second connector.

14. The battery cell according to claim 13, wherein the rupturable structure ruptures to disconnect the first connector from the second connector when the internal pressure of the battery cell reaches the threshold.

15. The battery cell according to claim 13, wherein the second connector comprises a second plate body and a second protruding structure around the second plate body, the second protruding structure protrudes from an inner surface of the second plate body toward the electrode assembly, and a second recess is formed on the second connector at a position corresponding to the second protruding structure, wherein the second recess is recessed from an outer surface of the second plate body toward the electrode assembly; and
the second plate body surrounds the rupturable structure, and the second protruding structure is fixedly connected to the housing.

16. The battery cell according to claim 15, wherein an outer side face of the second protruding structure abuts on an inner surface of the housing and is welded to the housing to close the opening.

17. The battery cell according to claim 15, wherein the second protruding structure abuts on the first tab to support the first tab.

18. The battery cell according to claim 1, wherein the rupturable structure surrounds the first connector by one circle.

19. The battery cell according to claim 1, wherein a groove is disposed on the end cap, and the rupturable structure is disposed in a region corresponding to the groove on the end cap.

20. The battery cell according to claim 19, wherein the end cap comprises a first nickel layer, a steel layer, and a second nickel layer, the first nickel layer is disposed on a surface that is of the steel layer and that is oriented toward the first tab, and the second nickel layer is disposed on a surface that is of the steel layer and that is oriented away from the first tab; and the groove is recessed toward the second nickel layer from a surface that is of the first nickel layer and that is oriented away from the steel layer, and a depth of the groove is greater than a thickness of the first nickel layer and less than a sum of the thickness of the first nickel layer and a thickness of the steel layer.

21. The battery cell according to claim 1, wherein the end cap electrically connects the first tab to the housing.

22. The battery cell according to claim 21, wherein the housing further comprises a sidewall and a bottom wall connected to the sidewall, the sidewall extends along a thickness direction of the end cap and is disposed around the electrode assembly, and an electrode lead-out hole is disposed on the bottom wall;

the electrode assembly further comprises a second tab of a polarity opposite to the first tab, and the second tab is disposed on the electrode assembly at an end oriented away from the opening; and the battery cell further comprises an electrode terminal mounted in the electrode lead-out hole, and the electrode terminal is electrically connected to the second tab.

23. The battery cell according to claim 22, wherein the bottom wall and the sidewall are a one-piece integral structure.

24. The battery cell according to claim 21, wherein the first tab is a negative tab, and a substrate material of the housing is steel.

25. The battery cell according to claim 1, wherein the battery cell is a cylindrical cell.

26. A battery, comprising a plurality of battery cells comprising the battery cell according to claim 1.

27. An electrical device, comprising the battery according to claim 26, wherein the battery is configured to provide electrical energy.

28. A method for manufacturing a battery cell, comprising:

providing a housing having an opening;

providing an electrode assembly, and mounting the electrode assembly into the housing, wherein a first tab is disposed on the electrode assembly at an end oriented toward the opening;

providing an end cap, and connecting the end cap to the housing so that the end cap fits and covers the opening, wherein the end cap comprises a first connector and a rupturable structure, and the rupturable structure is disposed along an edge of the first connector; and connecting the first connector to the first tab fixedly to form a fixing structure, so as to restrict movement of the first connector, wherein the end cap ruptures along the rupturable structure when an internal pressure of the battery cell reaches a threshold, so as to release the internal pressure, and the first connector comprises a first protruding structure and a first plate body around the first protruding structure, the first protruding structure protrudes from an inner surface of the first plate body toward the electrode assembly, and a first recess is formed on the first connector at a position corresponding to the first protruding structure, wherein the first recess is recessed from an outer surface of the first plate body toward the electrode assembly.

* * * * *